United States Patent
Jang et al.

(10) Patent No.: US 9,185,608 B2
(45) Date of Patent: Nov. 10, 2015

(54) APPARATUS AND METHOD FOR PERFORMING HANDOVER IN WIRELESS COMMUNICATION SYSTEM

(75) Inventors: Jae-Hyuk Jang, Suwon-si (KR); Sung-Jin Lee, Suwon-si (KR); Won-Il Roh, Yongin-si (KR); Jung-Je Son, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 350 days.

(21) Appl. No.: 12/496,074

(22) Filed: Jul. 1, 2009

(65) Prior Publication Data
US 2010/0003985 A1    Jan. 7, 2010

(30) Foreign Application Priority Data

Jul. 1, 2008 (KR) ............ 10-2008-0063353
Jul. 1, 2009 (KR) ............ 10-2009-0059556

(51) Int. Cl.
- *H04W 36/00* (2009.01)
- *H04W 52/40* (2009.01)
- *H04W 72/00* (2009.01)

(52) U.S. Cl.
CPC .............................. *H04W 36/0055* (2013.01)

(58) Field of Classification Search
CPC . H04W 36/00; H04W 52/40; H04W 72/0413; H04W 72/042; H04W 76/021
USPC ........... 455/436, 450, 451, 452.1, 452.2, 433, 455/3.03
See application file for complete search history.

(56) References Cited

U.S. PATENT DOCUMENTS

| | | | |
|---|---|---|---|
| 5,526,403 A * | 6/1996 | Tam | 455/426.1 |
| 6,856,786 B2 * | 2/2005 | Belostotsky et al. | 455/3.03 |
| 7,321,614 B2 * | 1/2008 | Jacobsen et al. | 375/221 |
| 7,546,124 B1 * | 6/2009 | Tenneti et al. | 455/436 |
| 7,657,273 B2 * | 2/2010 | Haartsen | 455/522 |
| 2002/0107026 A1 * | 8/2002 | Agrawal et al. | 455/453 |
| 2002/0137514 A1 * | 9/2002 | Mitsugi et al. | 455/436 |
| 2003/0211848 A1 * | 11/2003 | Rajkotia et al. | 455/436 |
| 2004/0073928 A1 * | 4/2004 | Alakoski et al. | 725/62 |
| 2005/0141477 A1 * | 6/2005 | Tomita et al. | 370/349 |
| 2005/0282548 A1 * | 12/2005 | Kim et al. | 455/436 |
| 2006/0099952 A1 * | 5/2006 | Prehofer | 455/440 |
| 2006/0111111 A1 * | 5/2006 | Ovadia | 455/439 |
| 2006/0203712 A1 * | 9/2006 | Lim et al. | 370/208 |

(Continued)

FOREIGN PATENT DOCUMENTS

| | | |
|---|---|---|
| CN | 1757183 A | 4/2006 |
| CN | 101106819 A | 1/2008 |

(Continued)

*Primary Examiner* — Kent Chang
*Assistant Examiner* — William Lu
(74) *Attorney, Agent, or Firm* — Jefferson IP Law, LLP

(57) ABSTRACT

An apparatus and a method for handover in a wireless communication system are provided. The handover method includes, when handing over to another Base Station (BS) while being serviced by a serving BS, determining whether there exists data to transmit in an uplink, and, when the data to transmit in the uplink exists, requesting bandwidth from the serving BS before commencing a network re-entry to a target BS for the handover.

17 Claims, 4 Drawing Sheets

(56) References Cited

U.S. PATENT DOCUMENTS

| | | | |
|---|---|---|---|
| 2007/0032238 A1* | 2/2007 | Kim et al. | 455/436 |
| 2007/0072612 A1* | 3/2007 | Haraguchi et al. | 455/436 |
| 2007/0086387 A1* | 4/2007 | Kang et al. | 370/331 |
| 2007/0191009 A1* | 8/2007 | Hong et al. | 455/436 |
| 2007/0211726 A1* | 9/2007 | Kuang et al. | 370/395.3 |
| 2008/0101295 A1* | 5/2008 | Tomita et al. | 370/331 |
| 2008/0146236 A1* | 6/2008 | Son et al. | 455/437 |
| 2009/0021572 A1* | 1/2009 | Garudadri et al. | 348/14.01 |
| 2009/0028112 A1 | 1/2009 | Attar et al. | |
| 2009/0141661 A1* | 6/2009 | Li et al. | 370/311 |

FOREIGN PATENT DOCUMENTS

| | | |
|---|---|---|
| EP | 1 871 130 A1 | 12/2007 |
| JP | 2007-259238 A | 10/2007 |
| JP | 2008-503172 A | 1/2008 |
| JP | 2009-111493 A | 5/2009 |
| JP | 2009111493 A | 5/2009 |
| KR | 10-2007-0072785 A | 7/2007 |
| KR | 10-0842555 B1 | 7/2008 |
| RU | 2 233 560 C2 | 7/2004 |
| RU | 2501186 C2 | 12/2013 |
| WO | 2007/078138 A2 | 7/2007 |
| WO | 2010/002193 A3 | 1/2010 |

* cited by examiner

APPARATUS AND METHOD FOR PERFORMING HANDOVER IN WIRELESS COMMUNICATION SYSTEM

PRIORITY

This application claims the benefit under 35 U.S.C. §119 (a) of a Korean patent application filed in the Korean Intellectual Property Office on Jul. 1, 2008 and assigned Serial No. 10-2008-0063353 and the Korean Intellectual Property Office on Jul. 1, 2009 and assigned Serial No. 10-2009-0059556, the entire disclosure of which is hereby incorporated by reference.

BACKGROUND OF THE INVENTION

1. Field of the Invention

The present invention relates to an apparatus and a method for handover in a wireless communication system. More particularly, the present invention relates to an apparatus and a method for reducing a handover delay in the wireless communication system.

2. Description of the Related Art

Rapid growth of the mobile communication market has included demands for various multimedia services in a wireless environment. To respond to these demands, research is being conducted on wireless communication systems for supporting high-speed services to guarantee mobility and Quality of Service (QoS) so as to offer the multimedia services.

To support a seamless service, the wireless communication system supports handover of a Mobile Station (MS). For instance, when the MS migrates from its serving Base Station (BS) to a target BS, the wireless communication system supports the handover which connects a call of the MS from the serving BS to the target BS to provide the seamless service to the MS. To connect the call to the target BS, the MS performs a ranging procedure with the target BS.

As discussed above, when the MS hands over to the target BS, the MS is serviced by the target BS only after it accesses the target BS through the ranging procedure with the target BS. In doing so however, the handover of the MS can be delayed due to the ranging procedure with the target BS.

Accordingly, there is a need for an improved apparatus and a method for reducing handover delay in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for reducing handover delay in a wireless communication system.

Another aspect of the present invention is to provide an apparatus and a method for reducing delay in handover by requesting necessary bandwidth information to a target BS before an MS re-enters a network of the target BS in a wireless communication system.

Yet another aspect of the present invention is to provide an apparatus and a method for transferring bandwidth information requested by an MS to a target BS when the MS serviced by a BS hands over to the target BS in a wireless communication system.

Still another aspect of the present invention is to provide an apparatus and a method for transferring information of a resource to be allocated to an MS to a target BS when the MS serviced by a BS hands over to the target BS in a wireless communication system.

A further aspect of the present invention is to provide an apparatus and a method for a BS to accurately confirm handover of an MS using a unique code assigned to the MS which requests the handover in a wireless communication system.

In accordance with an aspect of the present invention, a handover method of a Mobile Station (MS) in a wireless communication system is provided. The method includes, when handing over to another Base Station (BS) while being serviced by a serving BS, determining if there exists data to transmit in an uplink, and when the data to transmit in the uplink exists, requesting a bandwidth to the serving BS before commencing a network re-entry to a target BS for the handover.

In accordance with another aspect of the present invention, a method of a BS for supporting a handover of an MS in a wireless communication system is provided. The method includes determining whether to support handover of an MS when receiving a handover request of the MS from a neighboring BS, informing the neighboring BS of the handover supportability of the MS, allocating a resource to the MS by considering bandwidth request information of the MS when receiving handover indication information comprising bandwidth request information of the MS from the neighboring BS, and transmitting and receiving data to and from the MS using the resource allocated to the MS.

In accordance with another aspect of the present invention, a method of a Base Station (BS) for controlling a handover of a Mobile Station (MS) in a wireless communication system is provided. The method comprises determining at least one neighboring BS capable of supporting handover of an MS when the MS desires handover to another BS and transmitting information of a scheduled resource not allocated to the MS to a target BS.

In accordance with yet another aspect of the present invention, a handover apparatus of an MS in a wireless communication system is provided. The apparatus includes a receiver for receiving a signal, a transmitter for sending a signal, and a controller for, when handing over to another Base Station (BS) while being serviced by a serving BS and there exists data to transmit over an uplink, controlling to request a bandwidth to the serving BS before commencing a network re-entry to a target BS for the handover.

In accordance with still another aspect of the present invention, an apparatus of a BS for controlling a handover of an MS in a wireless communication system is provided. The apparatus includes a receiver for receiving a signal, a transmitter for sending a signal, a wireline interface for transmitting and receiving signals to and from at least one neighboring BS over a wired network, and a controller for, when receiving handover indication information comprising bandwidth request information of the MS through the wireline interface, allocating a resource to the MS by taking into account the bandwidth request information of the MS and controlling to transmit and receive data to and from the MS using the allocated resource.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technique for reducing handover delay in a wireless communication system.

Hereinafter, a Base Station (BS) servicing a Mobile Station (MS) prior to its handover is referred to as a serving BS and the BS to which the MS newly accesses through the handover is referred to as a target BS. When the BS and the MS transmit and receive signals with each other over radio resources, the BSs transmit and receive signals over a backbone.

When there exists data to transmit in the uplink prior to a network re-entry to the target BS in the wireless communication system, the MS requests a bandwidth to the target BS via the serving BS to reduce the handover delay. For example, at the point of the handover indication to the serving BS, the MS can request the bandwidth to the serving BS as shown in FIG. 1.

Figure 1:
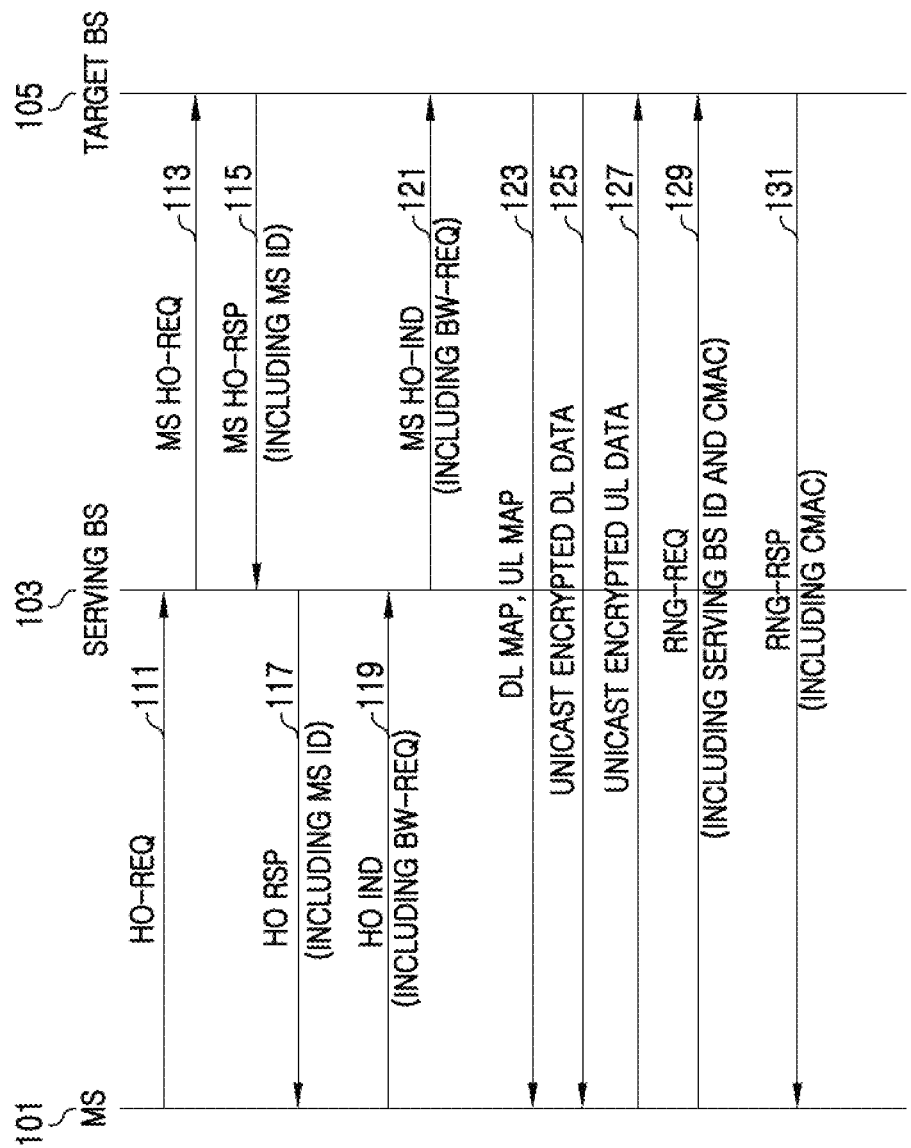
FIG. 1 illustrates a handover procedure in a wireless communication system according to an exemplary embodiment of the present invention.

FIG. 1 illustrates a handover procedure in a wireless communication system according to an exemplary embodiment of the present invention.

Referring to FIG. 1, when an MS 101 serviced by serving BS 103 desires handover, the MS 101 sends a HandOver (HO)-REQuest (REQ) message to the serving BS 103 in step 111.

Upon receiving the HO-REQ message from the MS 101, the serving BS 103 informs neighboring BSs of the handover request of the MS 101 in step 113. That is, the serving BS 103 sends the MS HO-REQ message of the MS 101 to the neighboring BSs to determine which neighboring BSs are capable of supporting handover of the MS 101. Herein, the neighboring BSs include a target BS 105.

After receiving the HO-REQ message of the MS 101, the neighboring BSs determine whether they can support handover of the MS 101. That is, when the MS 101 desires handover to a neighboring BS, each neighboring BS determines whether it can service the MS 101. The neighboring BSs capable of supporting the handover of the MS 101 assign an MS IDentifier (ID) to the MS 101.

To inform the serving BS 103 of their ability to support handover of the MS 101, the neighboring BSs each send an MS HO-ReSPonse (RSP) message regarding the MS 101 to the serving BS 103 in step 115. That is, the neighboring BSs capable of supporting handover of the MS 101 include the MS ID assigned to the MS 101 in the HO-RSP message and send the HO-RSP message.

The serving BS 103 confirms the information of the neighboring BSs that support handover of the MS 101 from the HO-RSP message. Next, the serving BS 103 generates a HO-RSP message including the information of the neighboring BSs that support handover of the MS 101 and sends the HO-RSP message to the MS 101 in step 117. Herein, the HO-RSP message includes the information of the candidate BSs to which the MS 101 can hand over, the MS ID of the MS 101 assigned by the candidate BSs, and encryption key (TEK) information for communication with the candidate BSs.

The MS 101 selects the target BS 105 for handover from among the candidate BSs confirmed from the HO-RSP message. In step 119, the MS 101 indicates the handover to the serving BS 103. In doing so, when there exists data to transmit in an uplink, the MS 101 sends BandWidth-REQuest (BW-REQ) information to the serving BS 103. For example, the MS 101 may send an HO-INDication (IND) message, indicative of the handover to the target BS, to the serving BS 103 and include therein the BW-REQ information. In an alternative embodiment, the MS 101 may constitute the BW-REQ message separately from the HO-IND message and then send the BW-REQ message to the serving BS 103.

The serving BS 103 confirms the target BS 105 selected by the MS 101 based on the HO-IND message. In an exemplary implementation, the serving BS 103 may confirm the BW-REQ information of the MS 101. For example, the serving BS 103 may confirm the BW-REQ information of the MS 101 in the HO-IND message. Alternatively, the serving BS 103 may confirm the BW-REQ information of the MS 101 based on the BW-REQ message received from the MS 101.

Next, the serving BS 103 indicates handover of the MS 101 to the target BS 105 in step 121. The serving BS 103 also sends the BW-REQ information of the MS 101 to the target BS 105. For example, the serving BS 103 may send the HO-IND message of the MS 101 and include the BW-REQ information of the MS 101 therein. Alternatively, the serving BS 103 may generate a BW-REQ message separately from the HO-IND message and send the BW-REQ message to the target BS 105.

Regarding the sending of the BW-REQ information of the MS 101 to the target BS 105, in an exemplary implementation, the serving BS 103 transmits information of scheduled resources not allocated to the MS 101 to the target BS 105. For instance, the serving BS 103 sends the BW-REQ information requested by the MS 101 in step 119, to the target BS 105. Alternatively, the serving BS 103 may send the BW-REQ information requested by the MS 101 in step 119, and the information of resources not allocated to the MS 101, to the target BS 105.

The target BS 105 confirms the handover of the MS 101 based on the HO-IND message received from the serving BS 103. Also, the target BS 105 confirms the BW-REQ information requested by the MS 101. Thus, the target BS 105 allocates resources to the MS 101 by taking into account the BW-REQ information of the MS 101 received from the serving BS 103 in step 123. In so doing, the target BS 105 sends a resource allocation message to the MS 101 using the MS ID assigned to the MS 101 in step 115. Herein, the resource allocation message includes a DownLink (DL) MAP and an UpLink (UL) MAP.

In step 125, the target BS 105 transmits DL data to the MS 101 using the DL resource allocated to the MS 101. Using the encryption key of the target BS 105 as confirmed from the HO-RSP message received from the serving BS 103 in step 117, the MS 101 can communicate with the target BS 105.

The MS 101 transmits UL data using the UL resources allocated from the target BS 105 in step 127.

The MS 101 performs a ranging procedure with the target BS 105 to access the target BS 105 in steps 129 and 131. For example, the MS 101 sends a ranging code to the target BS 105 over a certain channel. Upon receiving the ranging code, the target BS 105 allocates resources so that the MS 101 can send a RaNGing (RNG)-REQ message. Using the resource allocated from the target BS 105, the MS 101 sends the RNG-REQ message to the target BS 105 in step 129. The target BS 105 sends a RNG-RSP message to the MS 101 in reply to the RNG-REQ message received from the MS 101 in step 131.

In various exemplary embodiments, the data transmission and the reception between the MS 101 and the target BS 105 of steps 125 and 127 and the ranging procedure between the MS 101 and the target BS 105 of steps 129 and 131 can be carried out in order or in parallel. Furthermore, the ranging procedure of steps 129 and 131 may precede the data transmission and reception of steps 125 and 127.

In an exemplary embodiment, the MS 101 provides a bandwidth request to the serving BS 103 at the point of the handover indication to the serving BS 103. However, when there exists data to transmit in the uplink at any time before the network re-entry to the target BS 105, the MS 101 can provide the bandwidth request to the serving BS 103. Alternatively, the MS 101 may periodically transmit the BW-REQ information to the serving BS 103 until the network re-entry to the target BS 105.

In FIG. 1, it is assumed that the handover is initiated by the request of the MS 101 and the MS 101 determines the target BS 105. In another exemplary implementation, the serving BS 103 may request the handover or the serving BS 103 may determine the target BS 105. In this case, the MS 101 may selectively send the HO-IND message to the serving BS 103. That is, the MS 101 may or may not send the HO-IND message to the serving BS 103.

Figure 2:
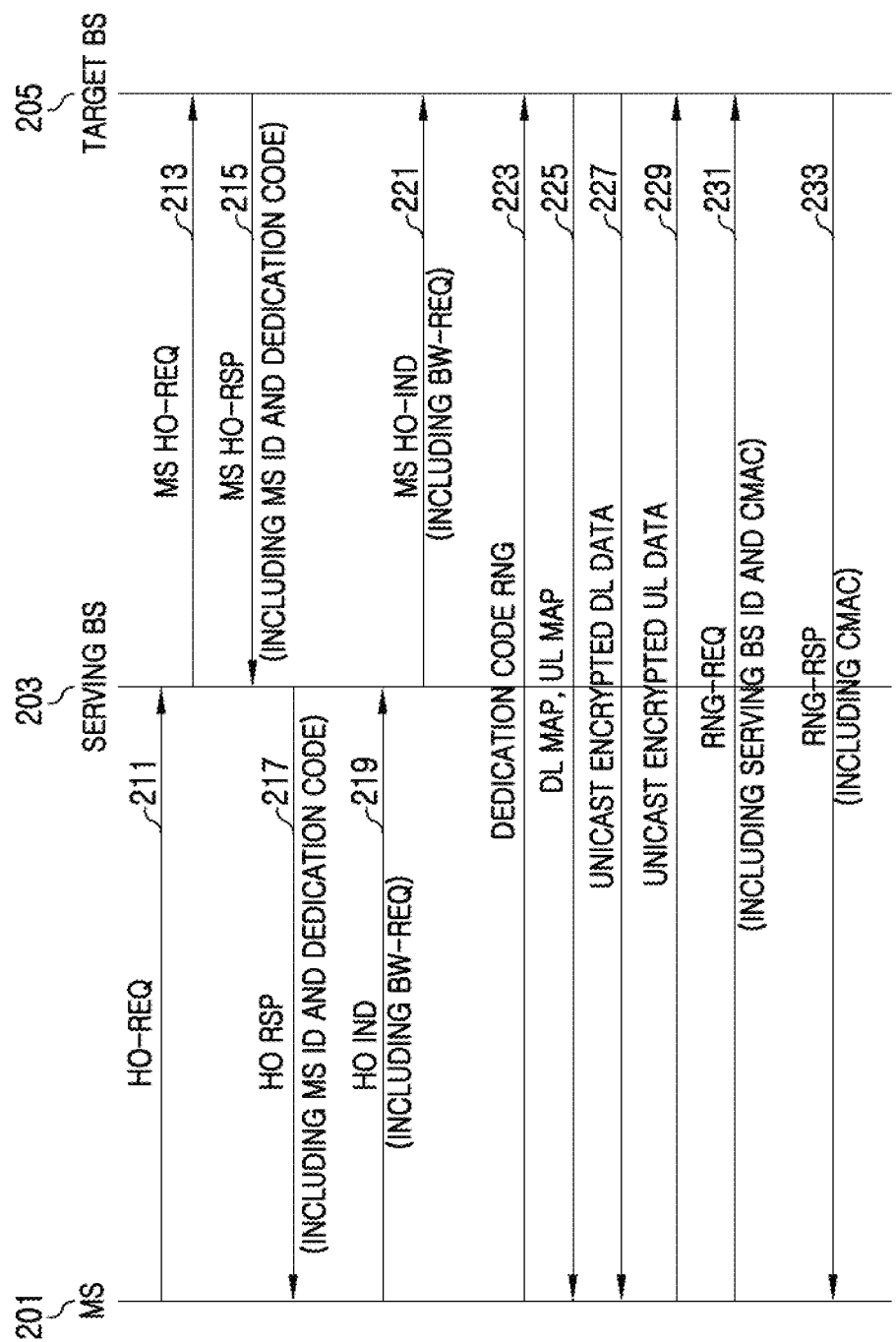
FIG. 2 illustrates a handover procedure in a wireless communication system according to an exemplary embodiment of the present invention.

To more clearly confirm the handover of the MS at the target BS, the wireless communication system may allocate a dedication code to the MS which requests the handover as illustrated in FIG. 2.

FIG. 2 illustrates a handover procedure in a wireless communication system according to an exemplary embodiment of the present invention.

Referring to FIG. 2, when an MS 201 serviced by a serving BS 203 desires handover, the MS 201 sends an HO-REQ message to the serving BS 203 in step 211.

Upon receiving the HO-REQ message from the MS 201, the serving BS 203 informs neighboring BSs of the handover request of the MS 201 in step 213. That is, the serving BS 203 sends the MS HO-REQ message of the MS 201 to neighboring BSs to determine which neighboring BSs are capable of supporting handover of the MS 201. Herein, the neighboring BSs include a target BS 205.

After receiving the HO-REQ message of the MS 201, the neighboring BSs determine whether they can support handover of the MS 201. That is, when the MS 201 desires handover to a neighboring BS, each neighboring BS determines whether it can service the MS 201. The neighboring BSs capable of supporting the handover of the MS 201 assign an MS ID and a dedication code for confirming the handover, to the MS 201.

To inform of the handover supportability of the MS 201, the neighboring BSs each sends an MS HO-RSP message regarding the MS 201 to the serving BS 203 in step 215. That is, the neighboring BSs capable of supporting handover of the MS 201 include the MS ID assigned to the MS 101 and the dedication code, in the HO-RSP message and send the HO-RSP message.

The serving BS 203 confirms the information of the neighboring BSs that support handover of the MS 201 from the HO-RSP message. In step 217, the serving BS 203 generates a HO-RSP message including the information of the neighboring BSs that support handover of the MS 201 and sends the HO-RSP message to the MS 201. Herein, the HO-RSP message includes the information of the candidate BSs to which the MS 201 can hand over, the MS ID of the MS 201 as assigned by the candidate BSs, encryption key (TEK) information for communication with the candidate BSs, and the dedication code allocated to the MS 201 by the candidate BSs.

The MS 201 selects the target BS 205 for handover from among the candidate BSs confirmed from the HO-RSP message. In step 219, the MS 201 indicates handover to the serving BS 203. In doing so, when there exists data to transmit in an uplink, the MS 201 sends BW-REQ information to the serving BS 203. For example, the MS 201 may include the BW-REQ information in the HO-IND message indicative of handover to the target BS and send the HO-IND message to the serving BS 203. In an alternative embodiment, the MS 201 may constitute the BW-REQ message separately from the HO-IND message and then send the BW-REQ message to the serving BS 203.

After sending the HO-IND message to the serving BS 203, the MS 201 sends the dedication code assigned from the target BS 205, to the target BS 205 in step 223. Namely, the MS 201 sends a dedication code ranging message to the target BS 205.

The serving BS 203 confirms the target BS 205 selected by the MS 201 based on the HO-IND message. In an exemplary embodiment, the serving BS 203 may also confirm the BW-REQ information of the MS 201. For example, the serving BS 203 may confirm the BW-REQ information of the MS 201 in the HO-IND message. Alternatively, the serving BS 203 may confirm the BW-REQ information of the MS 201 based on the BW-REQ message received from the MS 201.

In step 221, the serving BS 203 indicates handover of the MS 201 to the target BS 205. In an exemplary implementation, the serving BS 203 forwards the BW-REQ information of the MS 201 to the target BS 205. For example, the serving BS 203 may send the HO-IND message of the MS 201 to the target BS 205 and include the BW-REQ information of the MS 201 therein. Alternatively, the serving BS 203 may generate a BW-REQ message separately from the HO-IND message and send the BW-REQ message to the target BS 205.

Regarding the sending of the BW-REQ information of the MS 201 to the target BS 205, in an exemplary implementation, the serving BS 203 transmits information of scheduled resources not allocated to the MS 201, to the target BS 205. For instance, the serving BS 203 sends the BW-REQ message requested by the MS 201 in step 219, to the target BS 205. Alternatively, the serving BS 203 may send the BW-REQ message requested by the MS 201 in step 219 and the information of the resource not allocated to the MS 201, to the target BS 205.

The target BS 205 confirms the handover of the MS 201 based on the HO-IND message received from the serving BS 203. Also, the target BS 205 confirms the BW-REQ information requested by the MS 201.

When receiving the dedication code information from the MS 201, the target BS 205 may be assured of handover of the MS 201 to itself. Hence, the target BS 205 allocates the resource to the MS 201 by taking into account the BW-REQ information of the MS 201 received from the serving BS 203 in step 225. In so doing, the target BS 205 sends a resource allocation message to the MS 201 using the MS ID assigned to the MS 201 in step 215. Herein, the resource allocation message includes a DL MAP and a UL MAP.

Based on the dedication code received from the MS 201, the target BS 205 may recognize that it will receive the RNG-REQ message sent from the MS 201. In this situation, the target BS 205 can send the resource allocation information to the MS 201 by including the information of the resource through which the MS 201 can send the RNG-REQ message. Alternatively, the target BS 205 may add information of the resource through which the MS 201 can send the RNG-REQ message, into a separate resource allocation message.

After sending the resource allocation message to the MS 201, the target BS 205 transmits DL data to the MS 201 using the DL resource allocated to the MS 201 in step 227. Using the encryption key of the target BS 205 as confirmed from the HO-RSP message received from the serving BS 203 in step 217, the MS 201 can communicate with the target BS 205.

The MS 201 transmits UL data using the UL resource allocated from the target BS 205 in step 229.

The MS 201 performs the ranging procedure with the target BS 205 to access the target BS 205 in steps 231 and 233. For example, the MS 201 confirms the resource for the RNG-REQ message from the resource allocation message received from the target BS 205. Using the resource allocated from the target BS 205, the MS 201 sends the RNG-REQ message to the target BS 205 in step 231. The target BS 205 sends a RNG-RSP message to the MS 201 in reply to the RNG-REQ message received from the MS 201 in step 233

The data transmission and the reception between the MS 201 and the target BS 205 of steps 227 and 229 and the ranging procedure between the MS 201 and the target BS 205 of steps 231 and 233 can be carried out in order or in parallel. Furthermore, the ranging procedure of steps 231 and 233 may precede the data transmission and reception of steps 227 and 229.

In an exemplary embodiment, the MS 201 provides a bandwidth request to the serving BS 203 at the point of the handover indication to the serving BS 203. Alternatively, the MS 201 may periodically transmit the BW-REQ information to the serving BS 203 until the network re-entry to the target BS 205.

In FIG. 2, it is assumed that the handover is initiated at the request of the MS 201 and the MS 201 determines the target BS 205. However, the serving BS 203 may request the handover or the serving BS 203 may determine the target BS 205. In this case, the MS 201 may selectively send the HO-IND message to the serving BS 203. That is, the MS 201 may or may not send the HO-IND message to the serving BS 203.

Now, an exemplary structure of an MS for handing over to a target BS is explained.

Figure 3:
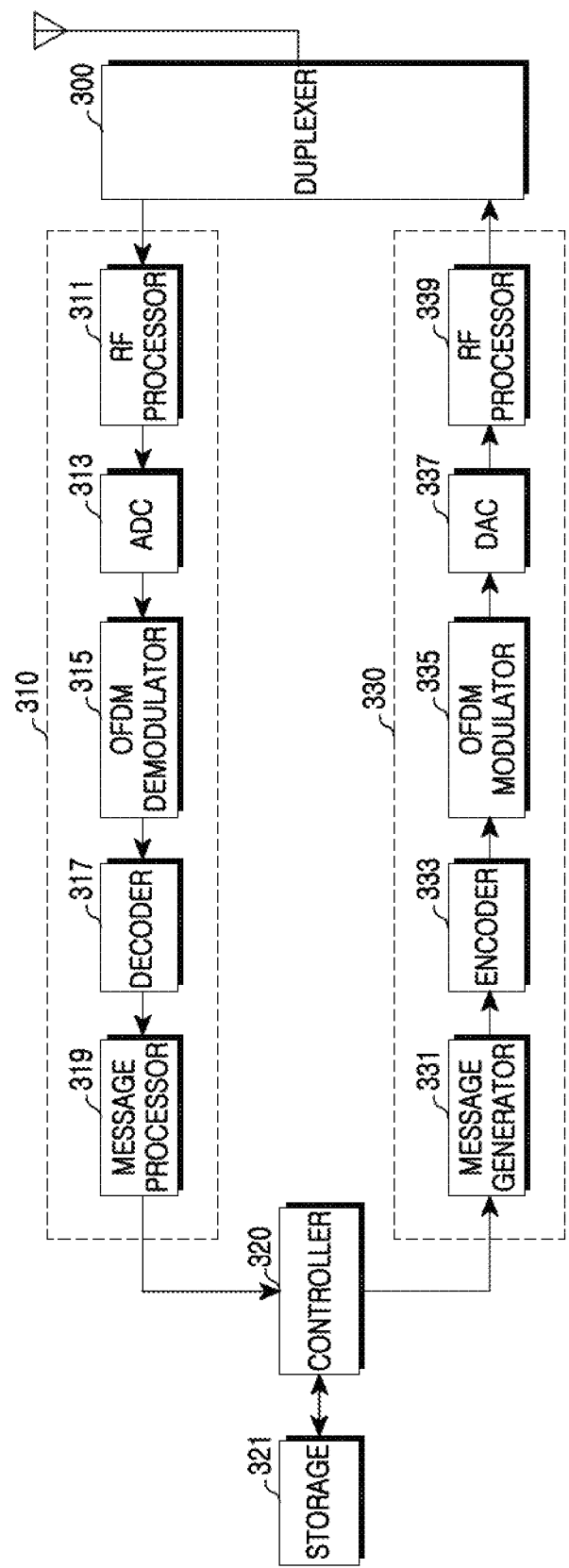
FIG. 3 illustrates a structure of a Mobile Station (MS) for handover according to an exemplary embodiment of the present invention.

FIG. 3 is a block diagram of an MS for handover according to an exemplary embodiment of the present invention.

Referring to FIG. 3, the MS includes a duplexer 300, a receiver 310, a controller 320, and a transmitter 330.

According to the duplexing, the duplexer 300 transfers the transmit signal output from the transmitter 330 over an antenna and provides a signal received over the antenna to the receiver 310.

The receiver 310 includes a Radio Frequency (RF) processor 311, an Analog/Digital Converter (ADC) 313, an Orthogonal Frequency Division Multiplexing (OFDM) demodulator 315, a decoder 317, and a message processor 319.

The RF processor 311 converts an RF signal output from the duplexer 300 into a baseband analog signal. The ADC 313 converts the analog signal output from the RF processor 311 into digital sample data. The OFDM demodulator 315 converts the time-domain sample data output from the ADC 313 into frequency-domain data using a Fast Fourier Transform (FFT) process.

The decoder 317 demodulates and decodes the signal output from the OFDM demodulator 315 at a corresponding modulation level. Herein, the modulation level indicates a Modulation and Coding Scheme (MCS) level.

The message processor 319 detects the control signal from the signal output from the decoder 317 and provides the detected control signal to the controller 320. For instance, the message processor 319 detects the HO-RSP message received from the serving BS and the resource allocation message and provides the detected messages to the controller 320.

The controller 320 controls the overall operation and the handover of the MS.

More particularly, in an exemplary implementation of controlling the handover, the controller 320 considers the signal intensity.

The controller 320 selects the target BS for the handover from the candidate BSs confirmed based on the HO-RSP message provided from the message processor 319.

When there exists data to transmit in the uplink prior to the network re-entry to the target BS, the controller 320 controls to send the BW-REQ information to the serving BS. For instance, the controller 320 controls to send the BW-REQ information when the handover is indicated to the serving BS. Alternatively, the controller 320 controls to periodically transmit the BW-REQ information before the network re-entry to the target BS. Hence, the MS can communicate with the target BS before the ranging with the target BS.

A storage 321 stores the MS ID assigned from the target BS for the handover, and the encryption key information under the control of the controller 320.

The transmitter 330 includes a message generator 331, an encoder 333, an OFDM modulator 335, a Digital/Analog Converter (DAC) 337, and an RF processor 339.

The message generator 331 generates the control message for the handover under the control of the controller 320. For example, when the controller 320 determines to hand over, the message generator 331 generates the HO-REQ message to request the handover to the serving BS.

When the controller 320 determines the target BS for the handover, the message generator 331 generates the HO-IND message to indicate the handover to the target BS. In so doing, the message generator 331 generates the BW-REQ message to request the necessary band. For example, the message generator 331 generates the HO-IND message including the BW-REQ information. Alternatively, the message generator 331 may generate the BW-REQ message separately from the HO-IND message.

The encoder 333 encodes and modulates the transmit signal or the message output from the message generator 331 at the corresponding modulation level.

The OFDM modulator 335 converts the frequency-domain data output from the encoder 333 into time-domain sample data (i.e., OFDM symbols) through an Inverse FFT (IFFT) process.

The DAC 337 converts the sample data output from the OFDM modulator 335 into an analog signal. The RF processor 339 converts the baseband analog signal output from the DAC 337 into an RF signal.

In an exemplary embodiment, the MS receives the MS ID of the candidate BSs and the encryption key information from the serving BS. Correspondingly, the controller 320 controls to store the MS ID assigned from the target BS and the encryption key information in the storage 321.

In another exemplary embodiment, the MS receives the MS ID of the candidate BSs, the encryption key, and the dedication code information from the serving BS. In a certain time after the handover is indicated to the serving BS, the controller 320 controls to transmit the dedication code information to the target BS.

In an exemplary embodiment, the controller 320 determines whether to request the handover and selects the target BS. In an alternative exemplary implementation, when the serving BS requests the handover or the serving BS selects the target BS, the controller 320 commences the handover according to the request of the serving BS. Also, the controller 320 confirms the target BS information determined by the serving BS. The controller 320 controls the message generator 331 to selectively transmit the HO-IND message to the serving BS.

The following explanations describe a structure of an exemplary BS for controlling handover of an MS.

Figure 4:
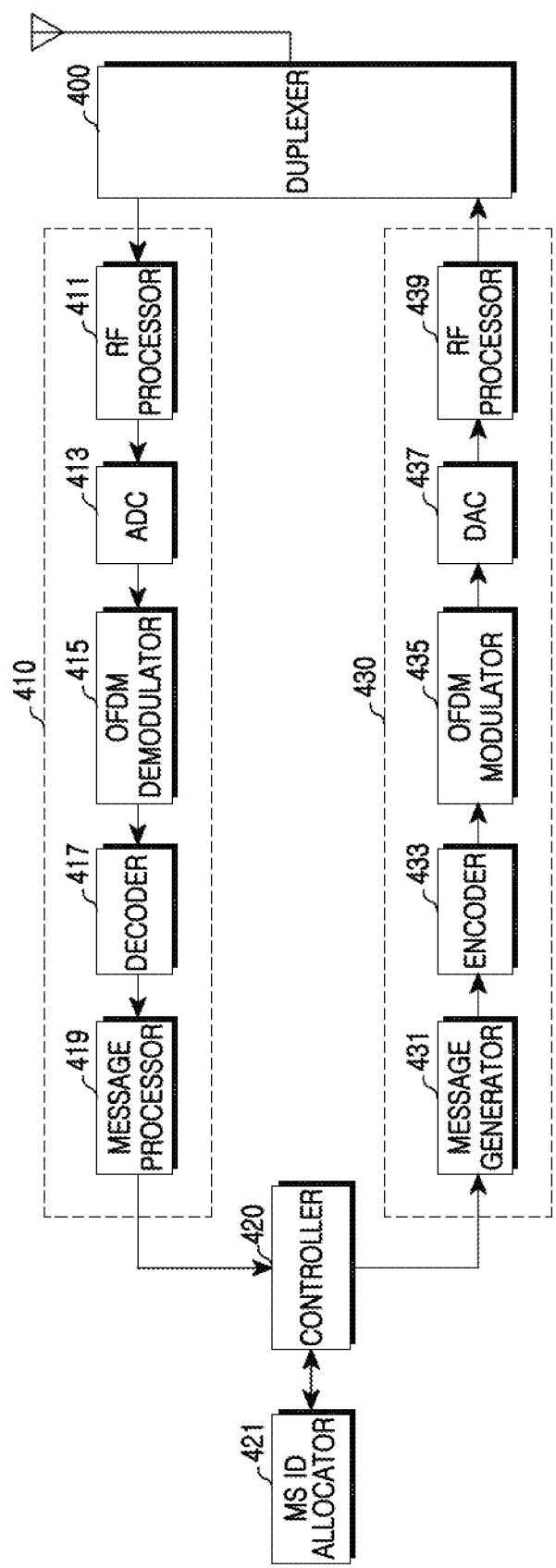
FIG. 4 illustrates a structure of a Base Station (BS) for handover according to an exemplary embodiment of the present invention.

FIG. 4 is a block diagram of a BS for handover according to an exemplary embodiment of the present invention.

Referring to FIG. 4, the BS includes a duplexer 400, a receiver 410, a controller 420, and a transmitter 430.

According to the duplexing, the duplexer 400 transfers a transmit signal output from the transmitter 430 over an antenna and provides a signal received over the antenna to the receiver 410.

The receiver 410 includes an RF processor 411, an ADC 413, an OFDM demodulator 415, a decoder 417, and a message processor 419.

The RF processor 411 converts an RF signal output from the duplexer 400 into a baseband analog signal. The ADC 413 converts the analog signal output from the RF processor 411 into digital sample data. The OFDM demodulator 415 converts the time-domain sample data output from the ADC 413 into frequency-domain data using the FFT process.

The decoder 417 demodulates and decodes the signal output from the OFDM demodulator 415 at the corresponding modulation level.

The message processor 419 detects the control signal from the signal output from the decoder 417 and provides the detected control signal to the controller 420. For instance, the message processor 419 detects the HO-REQ message and the HO-IND message received from the serviced MS and provides the detected messages to the controller 420.

The controller 420 controls overall operations of the BS and the handover of the MS traveling in its service coverage area. For example, when the BS is the serving BS, the controller 420 controls to request the handover of the MS to the neighboring BSs to search for candidate BSs capable of supporting handover of the MS. The controller 420 controls to send the HO-REQ message of the MS to the neighboring BSs over a wired network connected through a wireline interface. Herein, the wired network includes a backbone.

The controller 420 indicates the handover of the MS to the target BS confirmed from the HO-IND message provided from the message processor 419. For example, the BS includes a wireline interface for communicating with the neighboring BSs over the backbone. Hence, the controller 420 indicates the handover of the MS to the target BS through the wireline interface.

To indicate the handover of the MS to the target BS, the controller 420 controls to send the BW-REQ information of the MS handing over to the target BS, to the target BS. In so doing, the controller 420 controls to send information of resources not allocated to the MS through the scheduling, to the target BS. For example, the controller 420 controls to transmit the BW-REQ information requested by the MS to the target BS. Alternatively, the controller 420 may control to send the BW-REQ information requested by the MS and the information of the resource not allocated to the MS, to the target BS.

When the BS is the target BS, the controller 420 examines whether it is able to support handover of the MS requested by the neighboring BS through the wireline interface. When it can support handover of the MS, the controller 420 controls an MS ID allocator 421 to assign the MS ID to the MS.

In receiving the handover indication of the MS from the neighboring BS via the wireline interface, the controller 420 can confirm the resources required by the MS. Before the ranging procedure with the MS, the controller 420 allocates the resources to the MS by taking into account the required resource information of the MS.

The MS ID allocator 421 assigns the MS ID to the MS that desires handover, under the control of the controller 420.

The transmitter 430 includes a message generator 431, an encoder 433, an OFDM modulator 435, a DAC 437, and an RF processor 439.

The message generator 431 generates the control message for the handover under the control of the controller 420. For example, the message generator 431 generates the HO-RSP message including the information of the neighboring BSs capable of supporting handover of the MS. In an exemplary implementation, the message generator 431 constitutes the HO-RSP message to include the MS ID assigned by the neighbor BSs and the encryption key information.

Also, the message generator 431 generates the resource allocation information including the information of the resources allocated to the MS.

The encoder 433 encodes and modulates the transmit signal or the message output from the message generator 431 at the corresponding modulation level.

The OFDM modulator 435 converts the frequency-domain data output from the encoder 433 to time-domain sample data (i.e., OFDM symbols) through the IFFT process.

The DAC 437 converts the sample data output from the OFDM modulator 435 into an analog signal. The RF processor 439 converts the baseband analog signal output from the DAC 437 into an RF signal.

In an exemplary embodiment, in the case of the serving BS, the BS commences the handover as requested by the MS and confirms the target BS selected by the MS.

In an alternative embodiment, the BS may request the handover or select the target BS. In this situation, the controller 420 determines whether to commence the handover of the MS, and selects the target BS of the MS.

In a case of the target BS, the BS assigns the MS ID to the MS that desires handover.

Alternatively, the BS may assign the MS ID and the dedication code to the MS capable of supporting the handover. In this case, the MS ID allocator 421 allocates the MS ID and the dedication code to the MS under the control of the controller 420. After the controller 420 receives the handover indication of the MS from the neighboring BS, the handover of the MS is assured only by receiving the dedication code information of the MS from the message processor 419. Accordingly, after receiving the dedication code from the MS, the controller 420 allocates the resource to the MS by taking into consideration the required resource information of the MS.

The controller 420 may recognize that the MS will send the RNG-REQ message to the target BS, based on the dedication code received from the MS. Hence, the controller 420 allocates the resource by which the MS can send the RNG-REQ message.

As set forth above, the MS requests the required bandwidth information to the target BS via the serving BS before its network re-entry to the target BS to which the MS hands over in the wireless communication system. Therefore, the handover delay can be reduced, and the BS can confirm the handover of the MS by assigning the unique code to the MS which requests the handover.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a mobile station (MS) in a wireless communication system, the method comprising:
   receiving, from a serving base station (BS), a message comprising a dedicated code allocated by a target BS;
   transmitting, to the serving BS, a request for bandwidth for residual data to transmit from the MS before performing a network re-entry procedure with the target BS for the handover;
   transmitting, to the target BS, the dedicated code for the network re-entry;
   receiving, from the target BS, at the MS, resource allocation information on a resource allocated for the residual data that the serving BS has not allocated; and
   transmitting, to the target BS, the residual data from the MS using the resource allocated by the target BS.

2. The method of claim 1, wherein the transmitting of the request for bandwidth comprises:
   periodically transmitting bandwidth request information from the MS to the serving BS before the performing of the network re-entry procedure with the target BS.

3. The method of claim 1, wherein the transmitting of the request for bandwidth comprises:
   transmitting the request for bandwidth using a message indicating the handover of the MS to the target BS.

4. A method for operating a base station (BS) in a wireless communication system, the method comprising:
   receiving a handover request of a mobile station (MS) from a neighboring BS;
   transmitting, to the neighboring BS, a message comprising a dedicated code allocated to the MS;
   receiving, from the MS, the dedicated code for the network re-entry;
   receiving, from the neighboring BS, a request for bandwidth for residual data to be transmitted by the MS;
   allocating a resource to the MS based on the request; and
   receiving the residual data from the MS using the resource allocated to the MS.

5. The method of claim 4, further comprising:
   assigning an IDentifier (ID) to the MS if the handover of the MS is supported,
   wherein the message comprises the ID.

6. A method for operating a serving base station (BS) in a wireless communication system, the method comprising:
   receiving, from a target BS other than the serving BS, a first message comprising a dedicated code allocated by the target BS;
   transmitting, to a mobile station (MS), a second message comprising the dedicated code;
   receiving, from the MS, a request for bandwidth for residual data to be transmitted by the MS; and
   transmitting, to the target BS, the request for bandwidth.

7. The method of claim 6, further comprising:
   determining the target BS to which the MS is to hand over, among at least one neighboring BS capable of supporting the handover of the MS; and
   transmitting target BS information to the MS.

8. The method of claim 6, further comprising:
   transmitting information of at least one neighboring BS capable of supporting the handover of the MS, to the MS; and
   identifying the target BS to which the MS is to hand over, if the MS indicates the handover.

9. An apparatus for a mobile station (MS) in a wireless communication system, the apparatus comprising:
   a receiver configured to receive, from a serving base station (BS), a message comprising a dedicated code allocated by a target BS; and
   a transmitter configured to transmit, to the serving BS, a request for bandwidth for residual data to transmit from the MS before performing a network re-entry procedure with the target BS for the handover,
   wherein the transmitter is further configured to transmit, to the target BS, the dedicated code for the network re-entry,
   wherein the receiver is further configured to receive, from the target BS, at the MS, resource allocation information on a resource allocated for the residual data that the serving BS has not allocated, and
   wherein the transmitter is further configured to transmit, to the target BS, the residual data from the MS using the resource allocated by the target BS.

10. The apparatus of claim 9, wherein the transmitter is further configured to periodically transmit bandwidth request information to the serving BS before the network re-entry procedure with the target BS is performed.

11. The apparatus of claim 9, wherein the transmitter is further configured to transmit the request for bandwidth using a message indicating the handover of the MS to the target BS.

12. An apparatus for a base station (BS) in a wireless communication system, the apparatus comprising:
   a controller configured to receive a handover request of a mobile station (MS) from a neighboring BS, to transmit, to the neighboring BS, a message comprising a dedicated code allocated to the MS; and
   a receiver configured to receive, from the MS, the dedicated code for the network re-entry,
   wherein the controller is further configured to receive, from the neighboring BS, a request for bandwidth for residual data to be transmitted by the MS, and, to allocate a resource to the MS based on the request, and
   wherein the receiver is further configured to receive the residual data from the MS using the resource allocated to the MS.

13. The apparatus of claim 12, wherein, if the handover of the MS is requested from the neighboring BS, the controller is further configured to determines whether to support the handover of the MS and controls to inform the neighboring BS of a handover supportability.

14. The apparatus of claim 13, further comprising:
   an allocator for allocating an identifier (ID) to the MS,
   wherein the message comprises.

15. An apparatus for a serving base station (BS) for controlling a handover of a mobile station (MS) in a wireless communication system, the method comprising:
   a controller configured to receive, from a target BS other than the serving BS, a first message comprising a dedicated code allocated by the target BS during network re-entry;
   a transmitter configured to transmit, to the MS, a second message comprising the dedicated code;
   and a receiver configured to receive, from the MS, a request for bandwidth for residual data to be transmitted by the MS,
   wherein the controller is further configured to transmit, to the target BS, the request for bandwidth.

16. The apparatus of claim 15, wherein the controller is further configured to determine the target BS to which the MS is to hand over, among at least one neighboring BS capable of supporting the handover of the MS, and
   wherein the transmitter is further configured to transmit target BS information to the MS.

17. The apparatus of claim 15, wherein the transmitter is further configured to transmit information of at least one neighboring BS capable of supporting the handover of the MS, to the MS, and
   wherein the controller is further configured to identify the target BS to which the MS is to hand over, if the MS indicates the handover.

\* \* \* \* \*